May 8, 1934.  A. J. YEAGER  1,958,379
VALVE CONSTRUCTION
Filed May 26, 1933
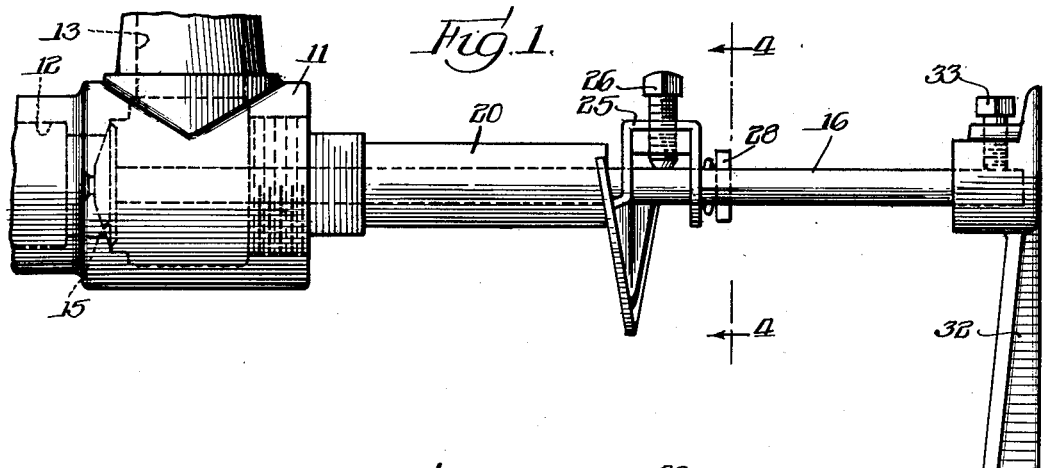
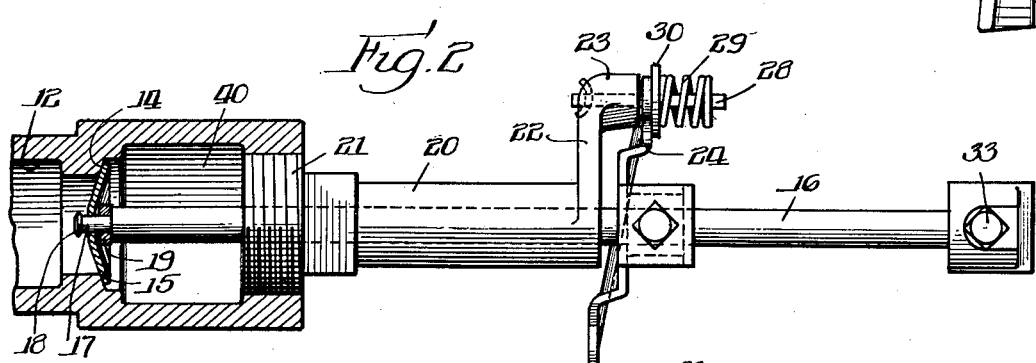
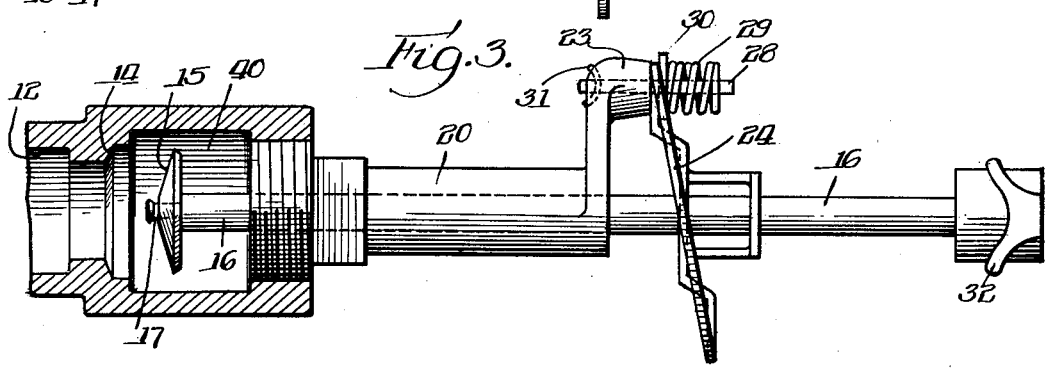
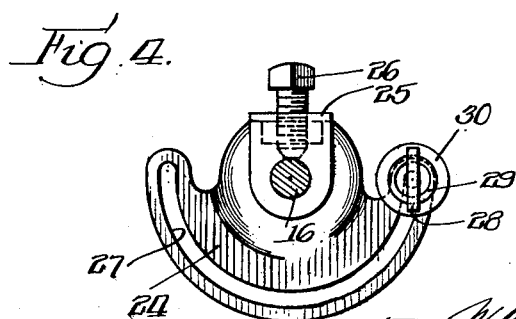
Inventor:
Anton J. Yeager Patented May 8, 1934

1,958,379

UNITED STATES PATENT OFFICE 1,958,379

VALVE CONSTRUCTION

Anton J. Yeager, Wisconsin Rapids, Wis., assignor to Prentiss Wabers Products Co., Wisconsin Rapids, Wis., a corporation of Wisconsin Application May 26, 1933, Serial No. 672,987

6 Claims. (Cl. 251—132)

This invention relates to a new and improved valve construction and more particularly to a form of disc valve adapted for use in connection with vapor stoves or the like.

Valves for use with vapor stoves or gas stoves are normally designed for quick opening, with a complete opening upon a movement of from ninety to approximately one hundred and eighty degrees. The valves should work easily and yet be held against slipping or accidental opening.

It is an object of the present invention to provide a new and improved valve construction.

It is a further object to provide a disc valve opened by means of a rotary movement of the valve stem, the movement being controlled by means external to the valve body.

It is an additional object to provide a valve of this character having the valve disc yieldingly held against its seat.

It is also an object to provide a valve having spring means for clamping the valve in any adjusted position.

It is a further object to provide a valve that is simple in design and construction and easy of installation and adjustment.

Other and further objects will appear as the description proceeds.

I have shown one preferred embodiment of my invention in the accompanying drawing, in which—

Figure 1 is a side elevation of the valve construction;

Figure 2 is a plan view of the construction of Figure 1, partly in section, with the valve closed;

Figure 3 is a view similar to Figure 2, but showing the valve open; and

Figure 4 is a section taken on line 4—4 of Figure 1.

In the drawing, the valve body 11 is shown as having the passages 12 and 13 formed therein, the passages meeting in the valve chamber 40. The passage 12 would normally be connected to any source of fluid fuel, such as to the gas main or gas generator in a gas stove, while the passage 13 would normally be connected to a burner of such a stove. As best shown in Figures 2 and 3, the valve body also has a valve seat 14 formed therein. The valve member 15 is formed as a dished disc adapted to bear against the seat 14. The member 15 is loosely fitted on the end of the valve stem 16, a reduced portion 17 of the stem extending through the disc and having the head 18 upset to retain the disc in place. The washer 19 fits on the reduced portion 17 adjacent the valve disc 15 and serves to make a tight closure for the opening in the valve disc which fits loosely on the portion 17.

The valve stem 16 extends through a closely fitting opening formed in the extension 20, which is screwed into the valve body by means of the threaded portion 21. The extension 20 carries the arm 22, the end 23 of which forms a stop member. The guide member 24 is secured to the valve stem 16 by means of the reversely bent portion 25 and the set screw 26. As clearly shown in Figure 4, the guide member 24 is provided with the arcuate slot 27 through which passes the retaining pin 28 holding the compression spring 29 against the washer 30. This washer 30 bears against the guide member 24. The retaining pin 28 extends through the stop member 23 and is retained in place by a cotter pin 31. It will be apparent from Figures 1, 2 and 3, that the guide member 24 is bent in such manner that the outer portion thereof adjacent the slot 27 is formed on a spiral curve, thus forming a cam portion with the valve stem 16 as the axis. The operating handle 32 is secured to the end of the valve stem 16 by means of the set screw 33.

In the operation of the valve it will be apparent that it is in the closed position in Figure 2, with the spring 29 urging it to this closed position by its thrust through the washer 30 against the guide member 24. At this point the guide member 24 does not engage the stop member 23 but is merely urged toward it. With the parts positioned in this manner, the valve is firmly pressed against its seat and will continue to be so pressed regardless of normal wear or variation in size or adjustment of parts. Due to the loose fit of the valve disc 15, it is capable of making a tight fit even though the valve seat 14 be not absolutely perpendicular to the axis of the valve stem 16.

To open the valve the valve stem 16 is turned in counterclockwise direction, as seen in Figure 4. The valve member 15 remains against its seat for the first part of this movement, but after the movement has proceeded a short distance the guide member 24 engages the stop member 23, being held against that member by force of the spring 29. Now as the movement continues, the spiral curve or cam portion of the guide member 24 bearing against the stop member 23 forces the valve stem 16 and consequently the valve disc 15 to the right, as seen in Figure 3. The spring 29 serves to hold the parts firmly together and prevent chatter or looseness. It will retain the valve in any adjusted position. It will be apparent that the valve may be very simply adjusted by loosening the set screw 26 and varying the relative location of the guide member 24 on the valve stem 16. Consequently the construction lends itself readily to uses such as with stoves having a multiple of burners where the valve stems differ in length and relation to the valves. In such constructions it is merely necessary to cut the valve stems to the desired length and the valve guide member may be quickly assembled on the stem at the proper position to engage the corresponding stop member, as desired.

The valve stem 16 merely has a close fit in the elongated guide member 20 and no packing is normally necessary at this point. There is no gas normally adjacent the entrance of the valve stem 16 into the guide member 20, as with the valve closed the gas is merely to the left, as seen in Figure 2. With the valve open the gas is all around the valve in the chamber 40, but the pressure is not great as it is relieved by the flow to the adjacent burner.

While the valve construction has been described as used in connection with a gas stove, it will be understood that it is capable of other and varied uses. One form of construction has been shown as illustrative only, but it is to be understood that I contemplate such changes and modifications as varying conditions and requirements may indicate are necessary or desirable, within the scope of the appended claims.

I claim:

1. In a valve construction, a valve body having a valve seat formed therein, a valve stem, a valve member carried by the valve stem, a cam member carried by the valve stem adjacent the valve body, a stop member carried by the valve body and resilient means carried by the valve body engaging the cam member to urge the cam member toward the stop member and thereby urge the valve member against the valve seat.

2. In a valve construction, a valve body having a valve seat formed therein, a valve stem, a valve member carried by the valve stem, a cam member carried by the valve stem adjacent the valve body, a fixed stop member extending from the valve body to engage the cam member to cause a linear motion of the valve stem upon rotation thereof, and resilient means carried by the stop member and engaging the cam member to urge said cam member toward the stop member.

3. In a valve construction, a valve body having a valve seat formed therein, a valve stem, a valve member carried by the valve stem, a cam member carried by the valve stem adjacent the valve body, a fixed stop member extending from the valve body to engage the cam member to cause a linear motion of the valve stem upon rotation thereof, a spring carried by the stop member and urging the cam member toward the stop member, and also urging the valve toward the valve seat, the cam member engaging the stop member to hold the valve clear of the seat in certain positions of the cam member.

4. In a valve construction, a valve body having a valve seat formed therein, a valve stem, a valve member carried by the valve stem, a cam member carried by the valve stem adjacent the valve body, a fixed stop member extending from the valve body to engage the cam member to cause a linear motion of the valve stem upon rotation thereof, and a spring carried by the stop member and urging the cam member toward the stop member, and also urging the valve toward the valve seat, the positions of the valve and cam member on the valve stem being such that in certain rotary positions of the valve stem the cam member is clear of the stop member and the spring holds the valve in contact with the valve seat.

5. In a valve construction, a valve body having a valve seat formed therein, a valve stem rotatably carried by the valve body and having a valve member thereon, a stop member on the valve body, a member adjustably clamped to the valve stem, said member having a spiral cam portion adapted to engage the stop member and cooperate therewith to cause linear movement of the valve stem upon rotation thereof, and means urging the spiral cam portion against the stop member.

6. In a valve construction, a valve body having a valve seat formed therein, a valve stem rotatably carried by the valve body and having a valve member thereon, a stop member on the valve body, a guide member adjustably clamped to the valve stem, said guide member having a spiral cam portion adapted to engage the stop member, an arcuate slot in said cam portion, a pin carried by the stop member extending into said slot and guided thereby, and a coil spring carried by the pin and urging the guide member toward the stop member.

ANTON J. YEAGER.